Patented June 23, 1942

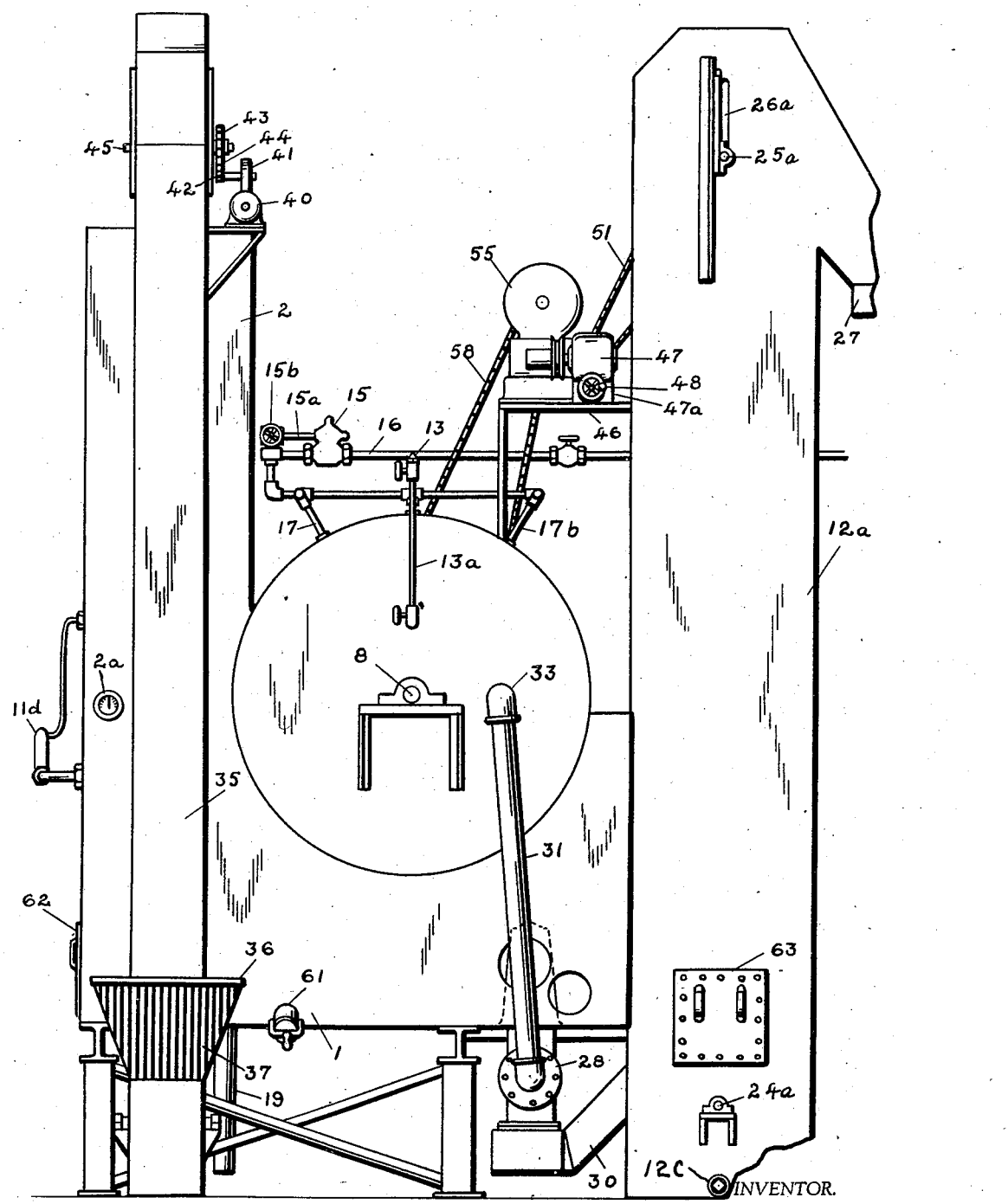

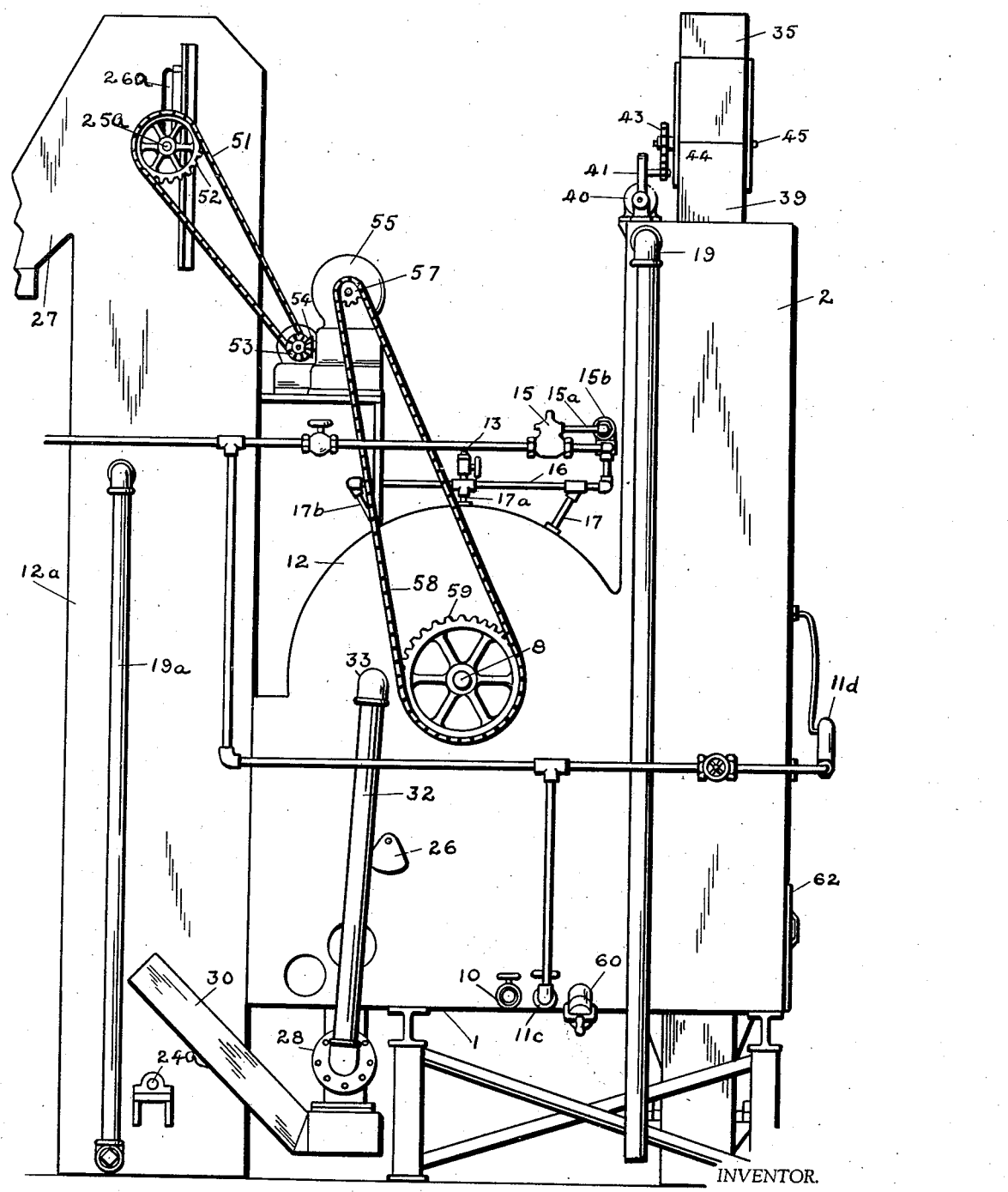

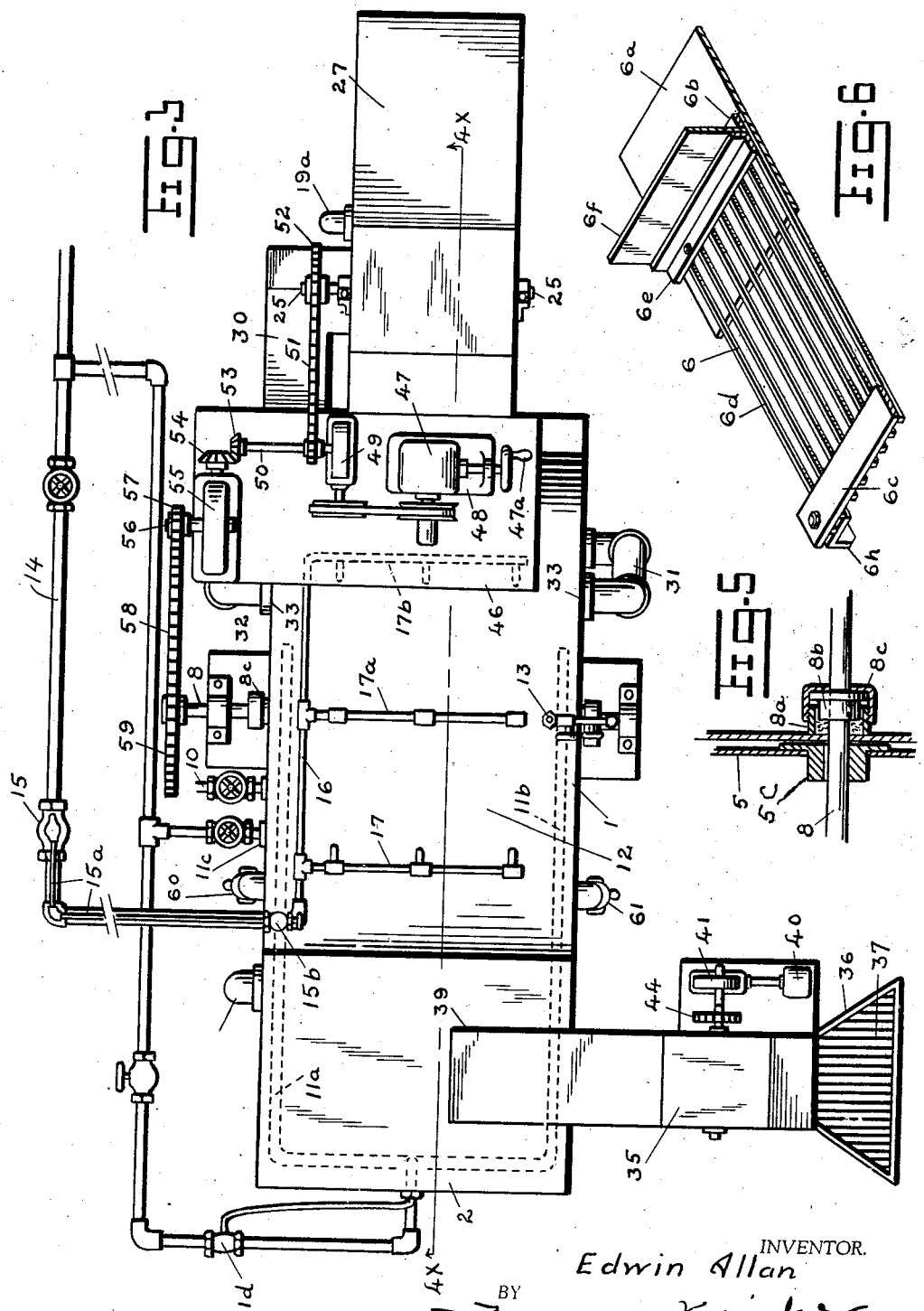

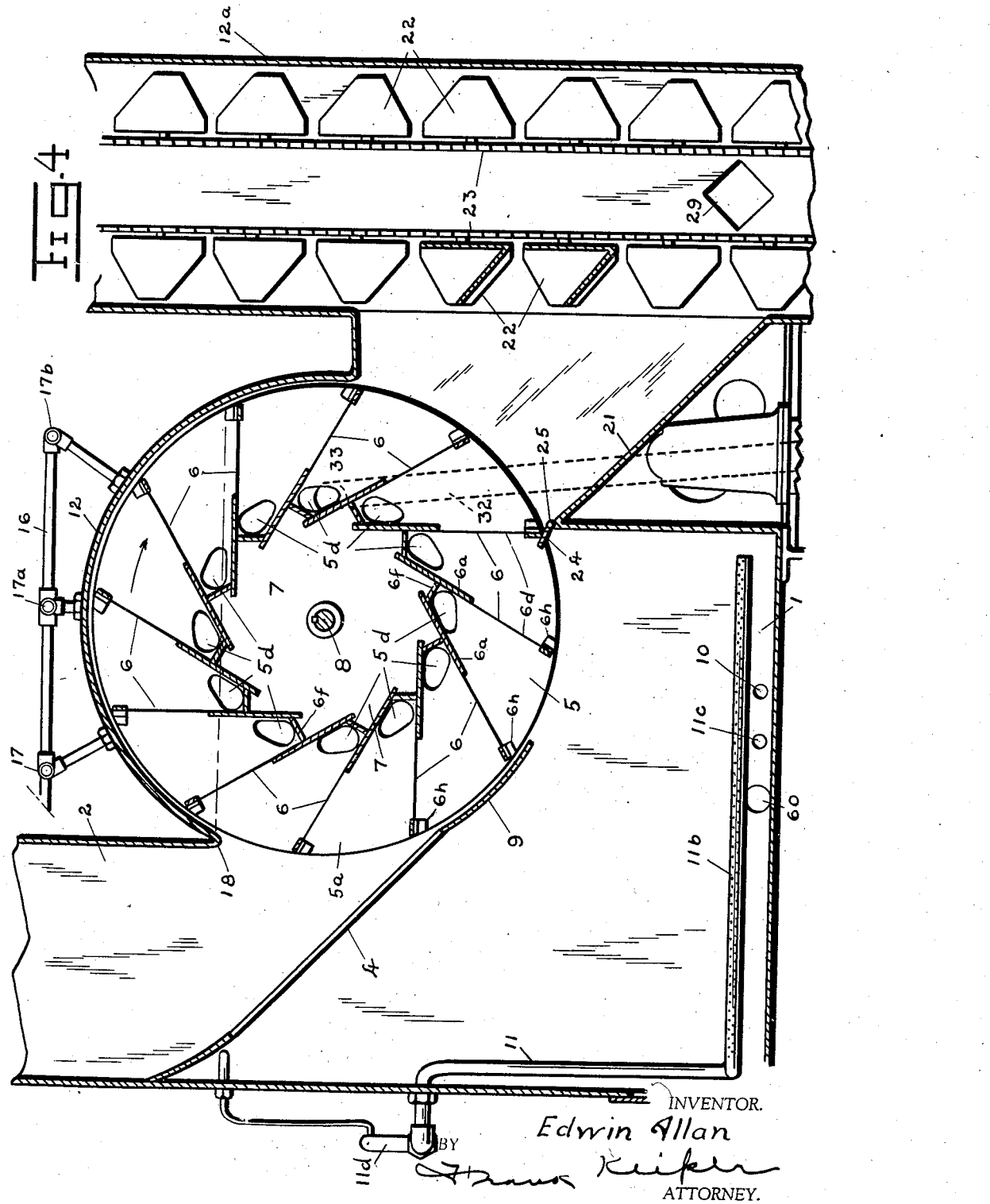

2,287,014

UNITED STATES PATENT OFFICE 2,287,014

APPARATUS FOR TREATING VEGETABLES WITH HOT WATER AND STEAM

Edwin Allan, Spencerport, N. Y.

Application July 24, 1940, Serial No. 347,169

4 Claims. (Cl. 146—194)

The object of this invention is to provide a machine or apparatus for scalding vegetables, more especially beets and carrots, with reference to preparing them for the removal of their skins preparatory to canning them.

Another object of the invention is to provide an apparatus that will first immerse the vegetables in boiling water, and will then remove the vegetables from the hot water at a given level, and will then subject the vegetables to live steam under pressure several pounds above the atmosphere, and will then return the vegetables to the boiling water at the same level.

Another object of the invention is to provide certain clean-outs for the purpose of removing dirt from the apparatus that may be carried into the apparatus by the vegetables and deposited therein.

Another object of the invention is to provide a local current of water for the purpose of flushing the vegetables from the pockets of the drum and delivering them to the cups of the elevator for removal from the apparatus.

Another object of the invention is to provide a valve that will insure the passage of the vegetables from the pockets of the drum into the outlet and keep them from getting into the bottom of the tank under the shaft of the drum.

Another object of the invention is to provide a drum having a sheet metal or cast disc at each end thereof and a supporting shaft for said discs with pockets arranged tangentially between said disc ends, said pockets being placed so that their inner ends approach each other and enclose a wide open cylindrical space between them and the shaft which supports the discs of the drum.

Another object of the invention is to control the temperature of the body of water in the tank with a thermostat.

Another object of the invention is to control the temperature of the steam above the drum by reducing the steam from a high temperature and a high pressure by passing the steam through a reducing valve.

Another object of the invention is to make the baffles which form the pockets of the drum of a grid-like structure, so that the water can readily flow out of and into the pockets.

Thees and other objects of the invention will be illustrated in the drawings, described in the specification, and pointed out in the claims at the end thereof.

In the drawings:

Figure 1 is a front elevation of the apparatus.

Figure 2 shows the apparatus viewed in elevation from the rear end, or the end opposite to that shown in Figure 1.

Figure 3 is a top plan view of the apparatus somewhat enlarged over the scale used in Figures 1 and 2.

Figure 4 shows the central portion of the apparatus viewed in section, the section being taken on the line $4x$—$4x$ of Figure 3, the showing being on a larger scale.

Figure 5 is a sectional elevation of the stuffing box surrounding the shaft that carries the drum, which stuffing box prevents the leaking of the water.

Figure 6 is a perspective view partly broken away, showing a portion of one of the baffles that form the pockets of the drum.

In the drawings like reference numerals indicate like parts.

In the drawings reference numeral 1 indicates the tank forming the casing or housing of the machine. At the upper left hand corner, as shown in Figures 1, 3 and 4, is shown a feed hopper 2 leading down into the tank. At the bottom of this hopper is an inclined sieve or grid 4 through which dirt can pass down vertically, but which will feed the vegetables by gravity down an incline to the pockets of the revolving drum 5 shown in section in Figure 4 and thus separates the dirt from the vegetables, the dirt settling into the bottom of the tank and the vegetables passing forward and down into the pockets of the drum.

The drum 5 is a structure having two side plates or discs 5a, 5a of sheet or cast metal, between which are placed tangentially twelve baffle plates 6, 6 which divide the drum into pockets or compartments. Each of these baffles extends from one side or disc of the drum to the other side. The outer end of each of these baffles extends to the periphery of the drum. The inner ends if projected would overlap each other. The inner ends of these baffles enclose a cylindrical space or hollow compartment 7 about 24" in diameter in the center of the drum from which the vegetables are excluded. The shaft of the drum is placed so that it will always be below the water line when the apparatus is ready for operation, and the bottom of the pockets formed by the baffles will on the rotation of the drum be lifted above the water line of the apparatus, as will presently be described.

The discs of the drum are provided with hubs 5c (see Fig. 5) and are mounted on a shaft 8, with which it revolves slowly at about seven revolutions per hour. It will also be understood that the diameter of the rotating drum in the full size apparatus preferably would be about 60 inches, and the length of the drum along the shaft can be whatever may be desired. The discs are perforated as indicated at 5d for a purpose that will presently be described.

Below the drum on the feed side is placed the concave plate 9, which holds the vegetables from dropping into the bottom of the tank until they are picked up by the pockets of the drum. This plate is shown extending around the drum about 30 degrees, or the width of the opening of one pocket, although it will be understood that the plate can extend clear around to enclose the opening in the tank below the drum. It will also be understood that this plate can be solid, or a solid plate with perforations, or it can be a grid.

It will also be understood that the drum rotates in the clockwise direction, although it will be understood that it can be rotated in the reverse or counter-clockwise direction if desired.

At the end of the housing opposite the feed hopper is the discharge trunk 12a through which the vegetables are raised and discharged, as will presently be described.

It will be understood that the housing or tank 1 is first filled with water, the water being admitted through the opening 10. After the air is out from under the concave the water flows into the housing or tank until it fills the concave above the drum, and it reaches the same level in the feed hopper and in the discharge trunk. In order to get the air out from under the concave, a relief valve 13 on top of the concave is provided. The water is raised to the boiling point by having steam fed through a pipe 11 which extends down into the bottom of the tank and has branches 11a and 11b extending to each side of the tank. These branches are perforated to secure a better distribution of the steam into the water. These branches 11a and 11b can be of any length desired. Provision is also made for admitting steam through the pipe 11c. All this steam is fed into the water under pressure and temperature so as to heat the water as rapidly as possible and keep the water in the bottom of the tank, at least, under a superheat, or a temperature somewhat above boiling point. A self-acting temperature controller is placed in the steam line at 11d, which shuts off the steam when the desired temperature is reached in the tank and admits more steam when the temperature drops.

After the water in the tank is heated, steam is then admitted under the concave 12 at the top. For this purpose a pipe 14 is provided which takes steam from a boiler where it is kept at high temperature and pressure; preferably about 90 pounds pressure and corresponding temperature. This steam passes through a reducing valve 15 into a pipe 16 having branches 17, 17a, and 17b, each of which is connected to the concave through three different openings.

Connected to the reducing valve is a small pipe line 15a that connects with a pilot valve 15b, which pilot valve is connected with the pipe line 16. This pilot valve is subject to the pressure in the pipe 16, and while it does not allow the steam to pass it communicates the pressure through the small pipe 15a as a back pressure to the reducing valve 15 and causes the valve 15 to close when a suitable pressure has been established under the concave plate 12. It will also be understood that the pilot valve and the reducing valve are standard equipment and are not new with me, although they embody part of the combination which embodies my invention.

The steam that goes through the reducing valve superheats the water in the concave as far as it may be necessary, and under pressure forces the boiling hot water down in the concave until it reaches the level in the housing fixed by the seam 18 where the feed hopper 2 and the concave 12 come together, or nearly reaches the level of this seam. As the water is forced down in the concave it will rise in the feed hopper 2 and in the discharge trunk 12a and put the water in the tank and the steam in the concave under more and more pressure until the water reaches the overflow outlet 19 in the feed hopper shown at the upper right hand corner of Figure 2, by which time the pressure of 2½ or 3 pounds is reached in the steam space under the concave above the drum. When the water is forced down to the level of the seam 18 steam can pass from under the concave into the inlet hopper 2, from which it can bubble up to the outer air. If the water displaced from the concave is not sufficient to fill the intake hopper and the discharge trunk at the delivery end, more water can be added to the tank until the desired level or pressure is established.

The level of the water below the concave is shown by a gauge glass 13a. By reducing the steam pressure in the concave, the level of the water rises in the concave in proportion and this will increase the time of exposure of the vegetables to the boiling water and decrease the time of exposure to the steam. By decreasing the height of the water in the hopper the steam pressure in the concave will be still further reduced, so that a considerable variation of treatment by hot water and by steam can be secured by these adjustments.

As above pointed out, the highest pressure is determined when the overflow is through the pipe 19. This pressure, however, can be reduced as follows: Connected to the delivery trunk 12a is a drain pipe 19a which connects with the trunk at a much lower level than does the pipe 19. As long as the pipe 19a is closed the drain will be through the pipe 19, but when the pipe 19a is opened the water will fall to the level established by or controlled by this pipe, which in turn will still further reduce the steam pressure and temperature in the concave.

The temperature of the water in the hopper is indicated by a thermometer at 2a.

The seam 18 acts as a seal to confine the steam in the concave above the drum under such pressure as may be established by the height of the water in the intake hopper.

On the right of the drum as indicated in Figure 4 is an inclined chute 21, on which the vegetables are discharged from the pockets of the drum and by which they are fed into the elevator cups 22 carried on the endless discharge conveyor 23. At the top of the inclined chute 21 is a swinging gate 24 pivoted at 25 on a shaft which extends to the outside of the housing. On the outside of the housing this shaft carries a counterweight 26 shown in Figure 2, which normally holds the gate 24 in an upright position. As the drum rotates the pockets contact with this gate in succession and cause it to swing down until the baffle passes it, when it resumes its upright position. This gate prevents any vegetables from passing down into the bottom of the tank, and causes all of the vegetables to follow the inclined chute 21, of which it is substantially a part.

At the right of the revolving drum as shown in Figure 4, is an upright discharge trunk 12a in which travels the endless discharge conveyor 23 which carries the elevator cups 22. This conveyor consists of two sprocket chains which travel around two sprocket wheels on the shaft 24a at the bottom of the trunk, which shaft is mounted in fixed bearings. At the top these sprocket chains travel around sprocket wheels that are carried on the shaft 25a, which shaft is adjustable up or down as is provided for by the slot 26a to take up wear in the sprocket chains. When the elevator cups reach the top and turn over, the contents of them are discharged from the trunk through the chute 27. From there the vegetables go to abrading machines or peelers, which constitute no part of this invention.

It wil also be understood that with this apparatus the vegetables are prepared for peeling and are not cooked more than necessary to secure the peeling, the cooking being finished as a separate step after the skins have been removed and possibly after the vegetables have been cut up. In other words, this apparatus is intended to blanch the vegetables, as that term is ordinarily understood by the canners.

Below the housing I is placed a rotary pump or circulator 28 driven by an electric motor. This circulator takes water from the bottom of the trunk 12a through the large opening 29 and tube 30, and by centrifugal force forces it up through pipes 31 and 32. These pipes discharge the water into opposite sides of the housing at the points indicated by the reference numeral 33 in Figure 4. The intake opening 29 is about 8" square, and the discharge pipes 31 and 32 are about 4" in diameter. The effect of these sizes is to draw the water from near the bottom of the trunk 12a at low velocity and discharge it through the elongated openings 5d in the discs at the opposite ends of the drum at high velocity. The asperating effect of these currents of water causes water to flow down from the openings 33 to the opening 29, as shown in Figure 4. In this way a current of water is maintained that flushes the vegetables down and out from each pocket in turn and into the elevator cups. This is desirable for the following reason. If vegetables are processed within a month or two from the time they are taken from the ground, they are heavier than water and will by gravity discharge themselves from the pockets of the drum and will move by gravity down to the elevator cups. But if the vegetables are held in storage for several months they will dry out to the extent that they will float, and in such case the current of water flowing down out of the pockets will carry the vegetables from the pockets to the elevator cups regardless of their tendency to float. The openings 5d are elongated to lessen any interruption of the flow of water by the intervening metal.

This apparatus is over 17 feet in height, and for the purpose of feeding the elevated wet hopper I provide a dry upright elevator housing 35 having a dry hopper 36 conveniently located thereon near the bottom thereof. This hopper has an inclined bottom 37 which is in substance a grid having open spaces between the slats. This grid permits more or less of the dirt that is delivered with the vegetables to fall out between the slats, so that it is not carried into the apparatus itself.

Inside of the dry housing 35 at the bottom is provided a shaft with sprocket wheels thereon and a similar shaft and sprocket wheels are provided at the top. Endless chains or conveyors travel over these sprocket wheels, on which chains are carried elevator cups, which receive the vegetables from the hopper 36.

The conveyor in the elevator housing 35 is independently driven by a motor 40, and a reducing gear 41, and a small sprocket 42, and a large sprocket 43 driven by a chain 44. The large sprocket 43 is carried on a shaft 45 that is adjustable up and down in the same way as the shaft 25a can be adjusted up and down.

The cups carry the vegetables up to the top and dump them into the wet hopper 2. At the top of the dry housing 35 is a spout 39 similar to the spout 27, which overhangs the wet hopper 2 so that the vegetables are discharged therefrom into the hopper 2 which is filled with water. The hopper 2 is partially covered to prevent splash. The vegetables then sink in the water ordinarily by gravity and fill the pockets of the drum 5 by which they are carried around up above the water level established at or above the seam 18 and into the steam space under the concave 12, where they are exposed to steam at a pressure of about 2½ pounds and at a temperature of 270 degrees more or less, and they are held in this steam until the vegetables are again submerged by the continuous rotation of the drum. It will be understood that if the hopper is full of water and the drum is turning seven R. P. H. the vegetables will be as much as eleven minutes submerged in boiling water in the hopper and in the pockets of the drum. Thereafter the vegetables will be lifted into the steam space, in which they will remain about three minutes, and thereafter they will then be submerged in the hot water about one minute or two until they are carried up out of the water by the elevator cups 22, after which they are discharged from the top of the trunk 12a and out of the apparatus.

Above the concave is provided a shelf 46 on which is carried a motor 47, which drives a variable speed reducing unit 48 of standard type. The speed reducing unit 48 is changed by shifting the motor 47, which is done by rotating the handle 47a, the details of which constitute no part of my invention, this being stock apparatus. This in turn drives a worm gear reduction unit 49, which in turn drives a shaft 50. On this shaft is a small sprocket wheel that drives a sprocket chain 51, which in turn drives a large sprocket wheel 52, which in turn drives the shaft 25a of the endless conveyors of the discharge trunk. On the end of the shaft 50 is a bevel gear 53 which drives a bevel gear 54, which in turn drives a worm gear reducing unit 55, which in turn drives a shaft 56 with a small sprocket wheel 57 thereon. This small sprocket wheel drives a sprocket chain 58, which drives a large sprocket wheel 59, which in turn drives a shaft 8 of the drum. By changing the gear reduction unit 48 the angular velocity of the drum can be changed from seven revolutions per hour to 21 revolutions per hour, and the speed of the elevator cups in the delivery trunk 12a will be changed to correspond.

Clean-out openings are provided as follows: On opposite sides of the housing are provided clean-out openings 60 and 61, controlled by valves, through which the water can drain from the bottom of the tank, carrying some of the dirt that may be deposited in the tank. When the tank is empty of water, the clean-out doors 62 and 63 at the bottom of the hopper 2 and at the bottom of the delivery trunk 12a, respectively, can be opened and all of the dirt can be removed, and the housing can then be washed out, and cleaned, and sterilized.

At the bottom of the trunk 12a is a drain 12c.

The baffles 6 in the drum are shown in Figure 6, in which one of the baffles is shown in perspective partly broken away. Each baffle consists of a sheet metal plate 6a. A bar 6b is provided at one end of the slats 6d and a bar 6c is provided at the other end. To these bars are welded the slats 6d, which are bars one-quarter of an inch square. An angle 6e is provided to which is welded a spacing plate 6f. The angle 6e is bolted to the plate 6a and clamps the slats between the angle 6e and plate 6a. The ends of the bars 6c are bolted to angle brackets 6h, which are welded at intervals of 30 degrees to the discs of the drum. The ends of the plate 6a are welded to the inside of the discs at each end of the drum.

In Figure 5 I have shown the stuffing box which surrounds the shaft 8 which carries the discs 5 of the drum. Surrounding this shaft a collar 8a is welded to the housing 12. This is threaded on the outside. On the shaft is placed a sliding collar or packing gland 8b. Packing is provided around the shaft between this collar and the housing. A cap 8c surrounds the shaft and makes threaded engagement with the collar 8a. By turning this cap the packing is squeezed around the shaft inside of the collar 8a and prevents leaks.

The invention of this application is an improvement on that shown in my prior application Serial No. 171,672, filed October 29, 1937, and this application is a continuation in part of said prior application.

I claim:

1. In an apparatus for scalding vegetables, the combination of a drum having a disc on each end thereof and baffles extending between the discs and dividing the drum into pockets, openings through the discs into the opposite end of each of the pockets, means for discharging a current of water through said openings into the pockets to carry the vegetables out of said pockets and away from the drum.

2. An apparatus comprising a central compartment, an upright trunk on one side thereof, said trunk and said central compartment being connected for the gravity flow of water back and forth between them, a drum rotating in said central compartment, said drum being divided into pockets, which pockets are adapted to discharge the vegetables into the upright trunk, an endless conveyor having cups thereon traveling up in said upright trunk, means for drawing water out of the bottom of said trunk and discharging it into the bottom of said pockets for the purpose of carrying the vegetables out of said pockets and away from the drum and into the elevator cups.

3. An apparatus comprising a central compartment, an upright trunk on one side thereof, said trunk and said central compartment being connected for the gravity flow of water back and forth between them, a drum rotating in said central compartment, said drum being divided into pockets, which pockets are adapted to discharge the vegetables into the upright trunk, and endless conveyor having cups thereon traveling up in said upright trunk, means for drawing water out of the bottom of said trunk and discharging it into the bottom of said pockets for the purpose of carrying the vegetables out of said pockets and away from the drum and into the elevator cups, an inclined chute extending from the drum to the elevator cups, a gate mounted to swing at the top of said chute, said gate projecting into the path of the outer ends of the pockets for the purpose of closing the opening between the drum and the chute, a counterbalance for normally holding said gate in an upright position.

4. An apparatus for treating vegetables in bulk comprising a drum having pockets eccentrically arranged therein, the pockets being separated by baffles, the inner ends of said baffles ending from the axis of the drum at a distance more than one-third of the radius of the drum and overlapping each other, said overlaps enclosing an open cylindrical space between them that is more than one-third the diameter of the drum, said baffles comprising a sheet metal plate at one end thereof, a bar at the other end thereof, slats fastened to the plate and the bar, a spacing plate mounted at right angles to the first named plate to hold the baffles apart at their ends said drum having a disc at each end thereof, openings through the discs into the opposite end of each of the pockets, means for discharging a current of water through said openings into the pockets to carry the vegetables out of said pockets and away from the drum.

EDWIN ALLAN.